K. W. PETERSON.
BALL BEARING CAGE.
APPLICATION FILED SEPT. 3, 1920.
1,361,177.
Patented Dec. 7, 1920.
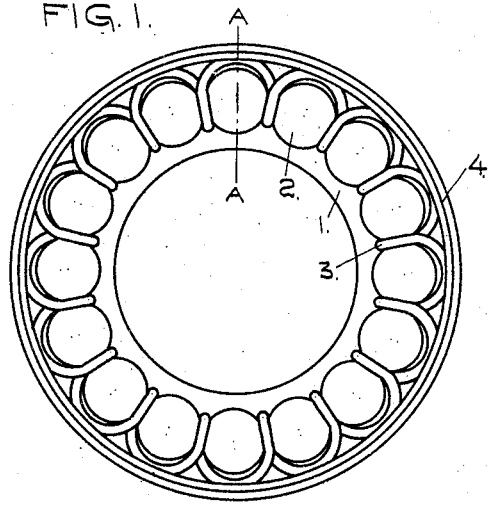
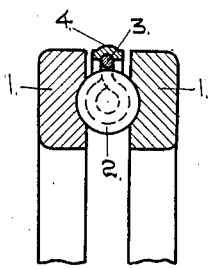
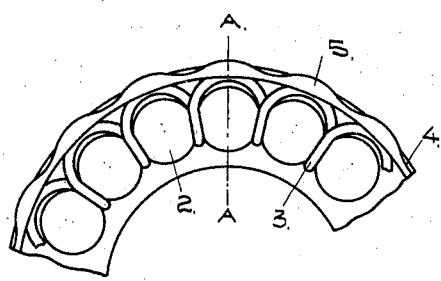
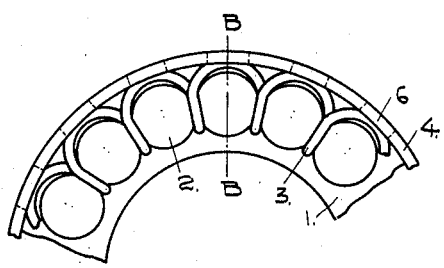
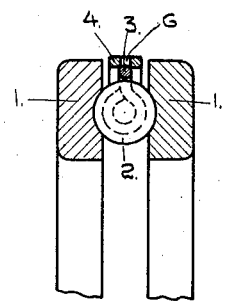
Inventor
K. W. Peterson
By H. R. Kerslake
Attorney

UNITED STATES PATENT OFFICE.

KARL WILHELM PETERSON, OF GOTTENBORG, SWEDEN.

BALL-BEARING CAGE.

1,361,177.  Specification of Letters Patent.  Patented Dec. 7, 1920.

Application filed September 3, 1920.  Serial No. 408,058.

*To all whom it may concern:*

Be it known that I, KARL WILHELM PETERSON, a subject of the King of Sweden, residing at Gottenborg, in the county of Gottenborg and Bohus and Kingdom of Sweden, have invented a new and useful Ball-Bearing Cage, of which the following is a specification.

Ball-cages of bent wire have been previously used in radial and axial ball bearings and the advantages thereof consist in the provision of a greater number of balls in the bearing than is possible with other types of ball cages. In the axial or thrust bearings, however, the balls, by the centrifugal action, are forced outwardly toward the intermediate portions of the wire cage thereby exposing the cage to a stretching strain while the tension between the annular ball journaling portions ceases causing a likelihood of the escape of the balls from the bearing. In addition, if a ball is broken the pieces thereof would be thrown past the rather restricted stopper, formed by the comparatively thin wire and enter adjacent toothed wheels or other similar moving parts, causing damage, when the ball bearing, for instance, is used in speed gears such as in motor cars and the like.

This invention has for its object to remove these inconveniences and principally consists of the provision of a guard ring positioned outside of the balls and the wire cage including briefly a metal strip, against which the wire cage is resting so that when the balls are forced toward the wire cage on account of the centrifugal action, such action will be transmitted to the guard ring and taken up by this ring and not by the wire cage proper. Moreover the ring is made of such a width that it practically fills up the whole space between the two race rings of the bearing and thereby prevents the pieces from any broken balls to be thrown out from the bearing. The method for the manufacture of the guard ring and its applying in connection with the wire-cage may be varied without interfering with the scope of this invention.

The invention is clearly illustrated in the accompanying drawings, in which:—

Figure 1 is a side view of a thrust ball bearing with one race ring removed.

Fig. 2 is a transverse section view taken along line A—A through the bearing as shown in Fig. 1.

Fig. 3 is a side view of a portion of a ball cage with a somewhat modified embodiment of the guard ring.

Fig. 4 shows a third embodiment of the guard ring.

Fig. 5 is a transverse sectional view of the embodiment shown in Fig. 4.

Referring now, more particularly, to the accompanying drawings there is provided a pair of race rings 1 between which balls 2 are provided and supported by the circumferential alining annular journaling portions 3 of the wire-cage. Around the row of balls 2 and the wire cage there is provided a closed metal guard ring 4. According to the embodiment, shown in Figs. 1 and 2, the guard ring 4 is provided with a groove, in which intermediate portions of the wire cage are placed. Fig. 3 shows an embodiment, wherein the guard ring is provided with dents 5, so that each intermediate portion of the wire cage is placed in such a dent. A sectional view through a bearing along the line A—A in Fig. 3 will be in accordance with Fig. 2. According to Figs. 4 and 5 the guard ring is provided with holes or openings 6, against the edges of which the intermediate portions of the wire cage support.

The mounting of the guard ring on the wire cage may be accomplished in different ways, as for example, the same may be turned over the complete wire cage, whereby it may be manufactured of such a resilient material, that this operation may take place if even the resilient capacity of the wire cage is made use of.

The width of the guard ring 4 should be but slightly narrower than the free space between the race rings 1 in order to prevent accidentally broken balls from being thrown from the bearing into the adjacent toothed wheels or movable parts of the machine, not shown, with which the bearing is associated.

Having thus fully described the invention what is claimed and desired to be secured by Letters Patent is:—

1. An improved thrust bearing comprising a pair of race rings, a plurality of balls therebetween, a wire cage formed with a plurality of circumferentially arranged and uniformly spaced ball journaling portions and with intermediate portions between the journaling portions, and a guard ring positioned between the race rings and around the balls and the intermediate portions of the wire-cage, whereby the intermediate portions of said cage are supported against the interior surface of that guard ring.

2. In an improved ball-cage as claimed in claim 1, wherein the interior surface of the guard ring is provided with a circumferential groove to receive the intermediate portions of the wire-cage.

3. In an improved ball-cage as claimed in claim 1, wherein the guard ring is provided with a circumferential groove to receive the intermediate portions of the wire-cage.

4. In an improved ball cage as claimed in claim 1, wherein the guard ring is provided with holes or openings against the edges of which the intermediate portions of the wire-cage are supported.

5. An improved ball-cage as claimed in claim 1 wherein the width of the guard ring is but slightly narrower than the distance between the race rings.

In testimony whereof I have affixed my signature.

KARL WILHELM PETERSON.